United States Patent
Reisinger et al.

(10) Patent No.: US 10,782,397 B2
(45) Date of Patent: Sep. 22, 2020

(54) DEVICE AND METHOD FOR DETERMINING A DISTANCE

(71) Applicants: Continental Automotive GmbH, Hannover (DE); Bayerische Motoren Werke AG, Munich (DE); NXP B.V., Eindhoven (NL)

(72) Inventors: Thomas Reisinger, Regenstauf (DE); Stefan Haller, Wenzenbach (DE); Daniel Knobloch, Munich (DE); Wolfgang Kuechler, Graz (AT); Frank Leong, Veldhoven (NL)

(73) Assignee: Continental Automotive GmbH, Hannover (DE)

( * ) Notice: Subject to any disclaimer, the term of this patent is extended or adjusted under 35 U.S.C. 154(b) by 325 days.

(21) Appl. No.: 15/921,352

(22) Filed: Mar. 14, 2018

(65) Prior Publication Data

US 2018/0275267 A1    Sep. 27, 2018

Related U.S. Application Data

(60) Provisional application No. 62/477,056, filed on Mar. 27, 2017.

(30) Foreign Application Priority Data

May 9, 2017 (DE) .......................... 10 2017 207 830

(51) Int. Cl.
*G01S 13/76* (2006.01)
*B60R 25/24* (2013.01)

(52) U.S. Cl.
CPC .......... *G01S 13/765* (2013.01); *B60R 25/245* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,580,381 | B2 * | 8/2009 | Michelon | G01S 19/11 342/357.29 |
| 2008/0040029 | A1 * | 2/2008 | Breed | B60W 30/16 701/514 |
| 2010/0045508 | A1 * | 2/2010 | Ekbal | G01S 13/765 342/145 |
| 2012/0252503 | A1 * | 10/2012 | Wu | H04W 64/00 455/456.6 |
| 2014/0350793 | A1 * | 11/2014 | Schrabler | G01S 13/02 701/41 |
| 2014/0357292 | A1 * | 12/2014 | Walma | H04W 64/00 455/456.1 |
| 2015/0181553 | A1 * | 6/2015 | Segev | H04W 64/003 455/456.1 |
| 2016/0341820 | A1 * | 11/2016 | Friedman | G01S 11/02 |
| 2018/0254910 | A1 * | 9/2018 | Dutz | H04W 12/04031 |
| 2018/0335514 | A1 * | 11/2018 | Dees | G01S 7/36 |
| 2019/0331788 | A1 * | 10/2019 | Balogh | G01S 13/876 |

* cited by examiner

*Primary Examiner* — Mamadou L Diallo

(57) ABSTRACT

The disclosure relates to an approximate determination of a distance between a wireless key which is assigned to a motor vehicle and a transceiver arrangement which is disposed in or on the motor vehicle. In the course of a ranging cycle, a first first path relating to a first threshold value and a second first path relating to a higher, second threshold value are calculated. Two distances are estimated on the basis of this dual first path calculation.

13 Claims, 1 Drawing Sheet

DEVICE AND METHOD FOR DETERMINING A DISTANCE

BRIEF DESCRIPTION OF THE DRAWINGS

In the following text, exemplary embodiments will be explained in greater detail with reference to the diagrammatic drawing, wherein identical or similar elements are provided with the same reference sign. In the drawing.

DETAILED DESCRIPTION

Figure 1:
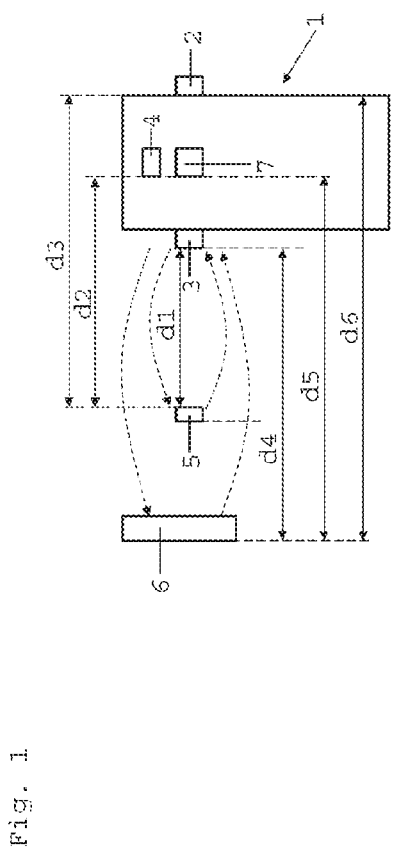
FIG. 1 shows a top view of a motor vehicle with an exemplary embodiment of a device according to the disclosure for determining a distance.

The disclosure relates to a device and a method for determining a distance. In particular, the disclosure relates to a device and a method for approximately determining a distance between a wireless key which is assigned to a motor vehicle and a transceiver arrangement which is disposed in or on the motor vehicle.

There are wireless keys known, also called smart keys, which allow passive entry to a motor vehicle. Corresponding systems are known particularly by the name PASE (Passive Start And Entry) or PEPS (Passive Entry Passive Start). Systems of such kind allow a user to open and start the associated vehicle in particular, wherein the wireless key may be located in a user's pants pocket, for example.

PASE systems are known that cooperate with various technologies to enable distance bounding (using a UWB technology) and localization (with an LF technology). Moreover, there are already PASE systems which use a UWB technology for distance bounding and localization. It is also known to carry out a distance determination (ranging with a "ranging schema" in other words a distance determination method) using a UWB technology, wherein a first path detection may be carried out by threshold-based analysis of a channel impulse response (CIR).

The object underlying the disclosure is to provide a device and a method of the kind described in the introduction which enable precise, secure detection of a first path, wherein localization is to be carried out, particularly using a UWB technology, for which a suitable protocol is to be defined.

This object is solved with the objects of the independent patent claims. Advantageous embodiments are the subject of the dependent claims, the following description and the figures.

According to a first aspect of the disclosure, a device for determining a distance is provided. The distance is particularly between a wireless key which is assigned to a motor vehicle and a transceiver arrangement disposed in or on the motor vehicle.

The feature according to which the wireless key is assigned to the motor vehicle may particularly be understood to mean that the wireless key is configured and intended to open and start that motor vehicle in particular. Of course, further functions the wireless key is able to perform with regard to the motor vehicle are also possible. In other words, the wireless key is "the" wireless key for the motor vehicle, wherein the wireless key (smart key) enables passive entry to the motor vehicle, in particular in the context of a PASE system or PEPS system.

The device may include a control unit for the distance determination that will be described in the following, which control unit may in particular be implemented by software. The device is designed to define a first threshold value of a correlation between a first message to be sent and a second message to be received (function a), and to define a second threshold value of a correlation between the first message to be sent and a third message to be received, wherein the second threshold value is greater than the first threshold value (function b).

With an exchange of messages between the transceiver arrangement and the wireless key, it is possible to calculate or estimate a distance between the transceiver arrangement and the wireless key. To this end, particularly repeated transmission in at least one direction and one transmission in the other direction may take place, wherein a specification regarding the ratio between two time differences may be considered for calculating a travel time and thus also calculating a distance. Corresponding methods are known from the prior art, for example from DE 10 2015 017 146 A1, the content of which is incorporated in its entirety in the disclosure of this new application (incorporated by reference).

The first message may be for example a message which is sent by the transceiver arrangement, particularly towards the wireless key. The second message may be for example a message which is sent by the wireless key, particularly towards the transceiver arrangement. According to this example, the wireless key represents an external first transmitter. In this context, the wireless key may be located in a pocket of a user of the wireless key, for example. The third message may be for example a message which is transmitted by an external second transmitter. Particularly when used in conjunction with the second message and the third message, the term "transmit" may also include reflection of the first message, for example. Thus for example the third message may be a reflection of the first message at an obstruction, a wall for example.

The device is further designed to send the first message via the transceiver arrangement which is disposed in or on a motor vehicle (function c).

The device is further designed to receive the second message from the external first transmitter via the transceiver arrangement (function d), and to receive the third message from the external second transmitter via the transceiver arrangement (function e).

The device is also designed to determine a first correlation between the received second message and the sent first message, wherein the determined first correlation exceeds the first threshold value but not the second threshold value (function f), and to determine a second correlation between the received third message and the sent first message, wherein the determined second correlation exceeds the second threshold value (function g).

For example, after the first message has been sent by the transceiver arrangement, the latter expects a certain message as the response from the wireless key. The control unit of the device is able to calculate the first correlation and the second correlation from an agreement between the expected message from the wireless key and the messages that are actually received (second and third messages).

The device is also designed to calculate a first distance between the first external transmitter and the transceiver arrangement based on a travel time of the received second message (function h), and to calculate a second distance between the second external transmitter and the transceiver arrangement based on a travel time of the received third message (function i).

With the present disclosure, it is in particular possible to separate a PASE method, which in particular is able to use a UWB technology to send the message(s), into two steps. Accordingly, a first step enables accurate localization, wherein security is limited in favor of accuracy. Furthermore, in a second step secure distance bounding is enabled, wherein accuracy is limited in favor of security.

This compromise between security and accuracy can be adjusted by suitable selection of the threshold values for a first path detection. Accordingly, a relatively high threshold may be selected for relatively high security (second threshold value), thereby reducing the probability of false alarms and successful preamble-injection attacks. With this relatively high threshold, accuracy is reduced, particularly because weak paths for which the correlation falls below the first threshold value are not detected. Furthermore, a relatively low threshold may be selected for relatively high accuracy (first threshold value), thus enabling a relatively high FP-DR (dynamic range), which enables the detection of weaker paths as well, wherein there is a greater risk of successful preamble-injection attacks or false alarms.

The present disclosure enables the accuracy of localization and the security of distance bounding to be optimized independently of each other without the need to carry out any additional ranging passes. The disclosure makes use of the principle according to which high accuracy (to achieve functional security particularly in a CA/CG application) and high security (particularly against false alarms/detection, brute force attacks or relay attacks) are not needed at the same time.

According to a first embodiment, it is provided that the received second message is the message whose correlation exceeds the first threshold value for the first time.

Moreover, the received third message may be the message whose correlation exceeds the second threshold value for the first time.

According to a further embodiment, the device is designed to calculate or estimate a position of the wireless key from calculated first and second distances. For this purpose, it may be provided that the transceiver arrangement comprises at least three, particularly eight transceivers. The device may further be designed to carry out functions (a) to (i) with respect to at least three of the transceivers, and also to calculate an estimated first position, in particular of the wireless key, based on the first distances between the external first transmitter and the at least three transceivers, and to calculate an estimated second position, in particular of the wireless key, based on the second distances between the external second transmitter and the at least three transceivers.

According to a further embodiment, the device is designed to carry out distance bounding with the external transmitters and at least one transceiver selected from the at least three transceivers.

Distance bounding may involve sending or transmitting a task message (first frame) from the at least one selected transceiver to the external first transmitter and/or to the external second transmitter, wherein the first task message may contain a task. The task may be solved by the external transmitter concerned within a processing time required therefor. Then, a response message may be sent or transmitted (second frame) which contains a solution to the task, particularly between the external transmitter concerned and the at least one selected transceiver.

In addition, measurement of a total outward and return travel time may be performed between a first point in time, when the transmission of the task message was started, i.e. when for example the at least one selected transceiver sent the task message, and a second point in time, when the transmission of the response message was completed, i.e. when the at least one selected transceiver received the response message. The time for processing the external transmitter concerned is subtracted from the total outward and return travel time, resulting in a net outward and return travel time. An upper limit of a distance between the at least one selected transceiver and the external transmitter concerned may be calculated based on the net outward and return travel time.

It may further advantageously be provided that the device is designed to output the first distance and the second distance. According to a further embodiment, it is further provided that the device is designed to send the first message by means of a UWB technology. The external second transmitter is preferably also designed to send the second message by means of a UWB technology, and the external third transmitter may also be designed to send the third message by means of a UWB technology. UWB stands for "ultra-wideband" and enables the use of extremely large frequency ranges with a bandwidth of at least 500 MHz or of at least 20% of the arithmetical mean of a lower and an upper limit frequency of a frequency band used.

The first threshold value may in particular assume the value 3 sigma. Further, the second threshold may in particular assume the value 6 sigma.

The device may further be designed to provide a preamble of the first message having a particularly small, preferably having a minimum data volume. This renders the first message particularly well suited for ensuring an efficient exchange of messages between the transceiver arrangement and the wireless key and/or the external transmitters.

According to a second aspect of the disclosure, a motor vehicle is provided which comprises a device according to the first aspect of the disclosure. The motor vehicle further comprises a transceiver arrangement which is disposed in or on the motor vehicle, and a wireless key which is assigned to the motor vehicle.

According to a third aspect of the disclosure, a method is provided for determining an approximate distance. In this context, the distance is particularly the distance between a wireless key which is assigned to a motor vehicle, and a transceiver arrangement which is disposed in or on the motor vehicle.

The method may particularly comprise the following steps:
providing a motor vehicle, in or on which a transceiver arrangement is disposed, and a wireless key which is assigned to the motor vehicle, and
determining a distance between the transceiver arrangement and the wireless key by
(a) defining a first threshold value of a correlation between a first message to be sent and a second message to be received,
(b) defining a second threshold value of a correlation between the first message to be sent and a third message to be received, wherein the second threshold value is greater than the first threshold value,
(c) sending the first message via the transceiver arrangement,
(d) receiving the second message from an external first transmitter via the transceiver arrangement, (e) receiving the third message from an external second transmitter via the transceiver arrangement,
(f) determining a first correlation between the received second message and the sent first message, wherein the determined first correlation exceeds the first threshold value but not the second threshold value,
(g) determining a second correlation between the received third message and the sent first message, wherein the determined second correlation exceeds the second threshold value,
(h) calculating a first distance between the first external transmitter and the transceiver arrangement based on a travel time of the received second message,
(i) calculating a second distance between the second external transmitter and the transceiver arrangement based on a travel time of the received third message.

In order to avoid repetitions relating to effects, advantages and embodiments of the method according to the second aspect of the disclosure, reference is made to the preceding notes relating to the device according to the first aspect of the disclosure. In this regard, the functional features described in connection with the embodiments of the device according to the first aspect of the disclosure may in particular be adopted as corresponding method features for corresponding embodiments of the method according to the second aspect of the disclosure.

According to a fourth aspect of the disclosure, a software element is provided which, when executed on a processor, instructs the processor to carry out the method steps (a) to (i) as claimed in the third aspect of the disclosure.

According to a fifth aspect of the disclosure, a computer-readable medium is provided, on which a software element is stored which, when executed on a processor, instructs the processor to carry out the method steps (a) to (i) as claimed in the third aspect of the disclosure.

FIG. 1 shows a motor vehicle 1, for example an automobile. The motor vehicle 1 comprises a transceiver arrangement which in the exemplary embodiment shown includes a first transceiver 2, a second transceiver 3 and a third transceiver 4. The first transceiver 2 and the second transceiver 3 may each be disposed for example in a wing mirror of motor vehicle 1, and the third transceiver 4 may be disposed inside the motor vehicle 1, close to a rearview mirror of the motor vehicle 1 for example. However, the number and arrangement of the transceivers 2 to 4 shown is purely exemplary. Accordingly, particularly eight transceivers may be disposed in and/or on the motor vehicle 1. The transceivers 2 to 4 are each designed to send a first message using a UWB technology, which first messages are receivable in particular by a wireless key 5, which in the example represented in FIG. 1 is positioned relatively close to the motor vehicle 1, e.g. less than 1 m from the motor vehicle 1. A preamble of the first message in this case may contain a particularly small data volume.

The wireless key 5 is assigned to the motor vehicle 1, and is further designed to enable a user (not shown) of the wireless key 5 to gain entry to the motor vehicle 1 in a PASE method, which means in particular to open a locked door of the motor vehicle 1 and to start motor vehicle 1. Wireless key 5 may in particular constitute an external first transmitter, which is able to send a second message, which is receivable by the transceiver arrangement.

FIG. 1 further shows an object 6, which in the exemplary embodiment shown is disposed in the outer surroundings of the motor vehicle 1, and is farther from the motor vehicle 1 than the wireless key 5. This object 6 may reflect the first message which is sent by the transceiver arrangement.

Accordingly, the object 6 constitutes an external second transmitter, which sends a third message (in the exemplary embodiment shown the third message corresponds to a reflection of the first message). Alternatively, however, the object 6 may also be an attacker's device, wherein the device functions as the external second transmitter and sends a third message in order to convince a control unit 7, which may particularly be connected for communication purposes with the transceiver arrangement, that the object 6 is the motor vehicle key which is assigned to the motor vehicle 1. The control unit 7 constitutes an element of a device for approximately determining a distance between the wireless key 5 and the transceiver arrangement.

Figure 2:
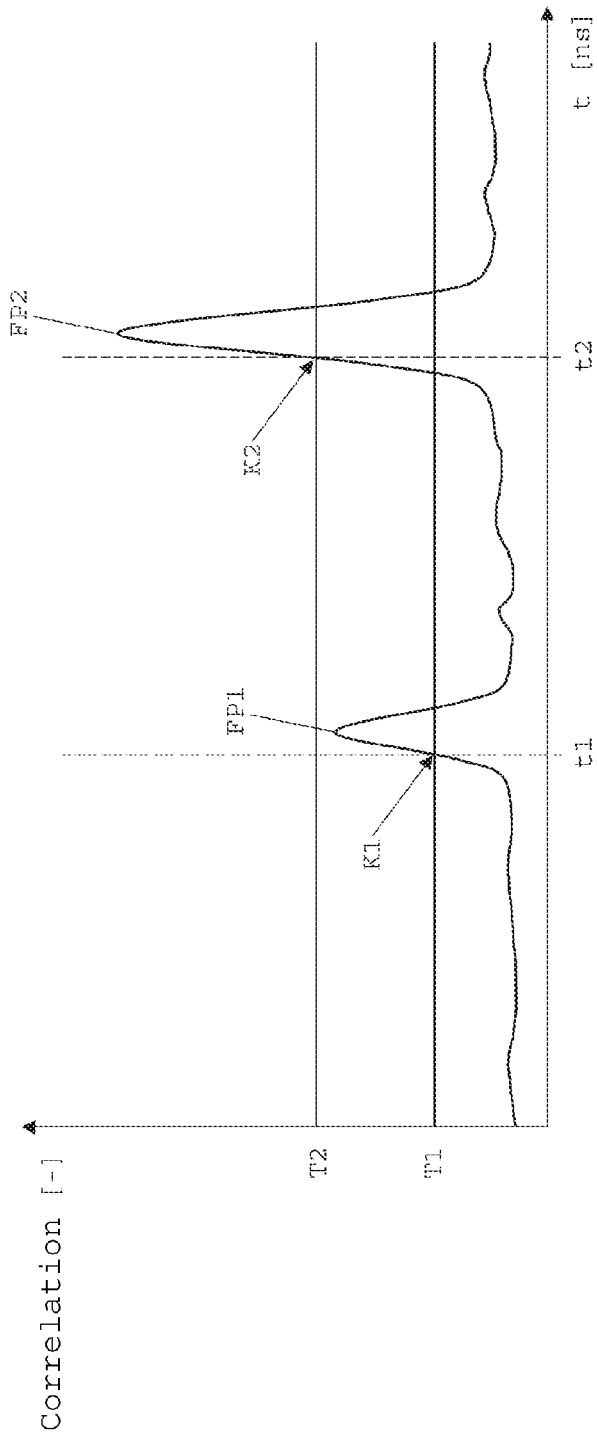
FIG. 2 shows a time-correlation diagram, in which in particular a first threshold value and a second threshold value as well as a first path and a second first path are mapped.

FIG. 2 shows a first threshold value T1 and a second threshold value T2. The first threshold value T1 relates to a correlation between the first message and the second message. The second threshold value T2 relates to a correlation between the first message and the third message. The value of the second threshold value T2 is greater than that of the first threshold value T1. The threshold values T1 and T2 may be defined for example by means of the control unit 7. In particular, the first threshold value may assume the value 3 sigma and the second threshold value may assume the value 6 sigma.

After the first message has been sent by the transceiver arrangement, it can be received by the wireless key 5 and reflected by the object 6, resulting in a third message which is received by the transceiver arrangement. The wireless key 5 may further send a second message as a response to the received first message, which is received by the transceiver arrangement.

In the exemplary embodiment shown in FIG. 1, the external second transmitter 7 is located farther from the transceiver arrangement than the wireless key 5 (external first transmitter), which may be in a pants pocket of a user, for example. The third message from the external second transmitter therefore has a longer travel time than the second message from the wireless key 5, and a corresponding second first path FP 2 is measured correspondingly later (at time point t2) than a first path FP1, which is based on the first message. However—as shown in FIG. 2—it may be that a correlation K2 between the third message and the first message is greater than a correlation K1 between the second message and the first message.

The first correlation K1 between the received second message and the sent first message may be determined by means of the control unit 7, wherein the determined first correlation K1 exceeds the first threshold value T1 but not the second threshold value T2. In the exemplary embodiment shown in FIG. 2, the second message is the message whose correlation K1 at a first point in time t1 exceeds the first threshold value T1 for the first time. In the exemplary embodiment shown, the first point in time t1 may be indicated by a total travel time between sending of the first message and receiving of the second message by the transceiver arrangement.

Moreover, the second correlation K2 between the received third message and the sent first message may be determined by means of the control unit 7, wherein the determined second correlation K2 exceeds the second threshold value T2. In the exemplary embodiment shown in FIG. 2, the third message is the message whose correlation K2 exceeds the second threshold value T2 for the first time at a second point in time t2. In the exemplary embodiment shown, the second point in time t2 may be indicated by a total travel time between sending of the first message and receiving of the third message by the transceiver arrangement.

The control unit 7 is also able to determine a respective first distance d1 to d3 between the first external transmitter, in the exemplary embodiment shown the wireless key 5, and each of transceivers 2 to 4 of the transceiver arrangement based on the travel time t1 of the received second message in each case. In addition, the control unit 7 is able to determine a respective second distance d4 to d6 between the second external transmitter, in the exemplary embodiment shown the object 6, and each of the transceivers 2 to 4 of the transceiver arrangement based on the travel time t2 of the received third message in each case. The control unit 7 is also able to output the three first distances d1 to d3 and the three second distances d4 to d6.

The control unit 7 calculates an estimated first position of the wireless key 5 based on the first distances d1 to d3 between the wireless key 5 and the three transceivers 2 to 4. In similar fashion, the control unit 7 calculates an estimated second position of the wireless key 5 based on the second distances d4 to d6 between the external second transmitter 6 and the three transceivers 2 to 4.

The control unit 7 may also be designed to perform distance bounding with the wireless key 5 and/or with the external transmitters 5, 6 and at least one transceiver selected from the three transceivers 2 to 4.

The invention claimed is:

1. A distance determining device for determining a distance, wherein the device is configured to:
   (a) define a first threshold value of a correlation between a first message to be sent and a second message to be received,
   (b) define a second threshold value of a correlation between the first message to be sent and a third message to be received, wherein the second threshold value is greater than the first threshold value,
   (c) send the first message via a transceiver arrangement disposed in or on a motor vehicle,
   (d) receive the second message from an external first transmitter via the transceiver arrangement,
   (e) receive the third message from an external second transmitter via the transceiver arrangement,
   (f) determine a first correlation between the received second message and the sent first message, wherein the determined first correlation exceeds the first threshold value but not the second threshold value,
   (g) determine a second correlation between the received third message and the sent first message, wherein the determined second correlation exceeds the second threshold value,
   (h) calculate a first distance between the first external transmitter and the transceiver arrangement based on a travel time of the received second message, and
   (i) calculate a second distance between the second external transmitter and the transceiver arrangement based on a travel time of the received third message.

2. The device as claimed in claim 1, wherein the received second message is the message whose correlation exceeds the first threshold value for the first time.

3. The device as claimed in claim 1, wherein the received third message is the message whose correlation exceeds the second threshold value for the first time.

4. The device as claimed in claim 1, wherein the transceiver arrangement comprises at least three transceivers, and the device is further configured to:
   carry out the functions (a) to (i) with respect to at least three of the transceivers,
   calculate an estimated first position based on the first distances between the external first transmitter and the at least three transceivers, and
   calculate an estimated second position based on the second distances between the external second transmitter and the at least three transceivers.

5. The device as claimed in claim 1, wherein the device is configured to carry out distance bounding with the external transmitters and at least one transceiver selected from the at least three transceivers.

6. The device as claimed in claim 1, wherein the device is configured to output the first distance and the second distance.

7. The device as claimed in claim 1, wherein the device is configured to send the first message by ultra-wideband technology.

8. The device as claimed in claim 1, wherein the first threshold value assumes a value of 3 sigma.

9. The device as claimed in claim 1, wherein the second threshold value assumes a value of 6 sigma.

10. The device as claimed in claim 1, wherein the device is configured to provide a preamble of the first message having a minimal data volume.

11. A motor vehicle comprising:
    a device as claimed in claim 1,
    the transceiver arrangement disposed in or on the motor vehicle, and
    a wireless key assigned to the motor vehicle.

12. A method for determining a distance, the method comprising the steps of:
    providing a motor vehicle, at in or on which a transceiver arrangement is disposed, and a wireless key assigned to the motor vehicle, and
    determining an approximate distance between the transceiver arrangement and the wireless key by:
    (a) defining a first threshold value of a correlation between a first message to be sent and a second message to be received,
    (b) defining a second threshold value of a correlation between the first message to be sent and a third message to be received, wherein the second threshold value is greater than the first threshold value,
    (c) sending the first message via the transceiver arrangement,
    (d) receiving the second message from an external first transmitter via the transceiver arrangement,
    (e) receiving the third message from an external second transmitter via the transceiver arrangement,
    (f) determining a first correlation between the received second message and the sent first message, wherein the determined first correlation exceeds the first threshold value but not the second threshold value,
    (g) determining a second correlation between the received third message and the sent first message, wherein the determined second correlation exceeds the second threshold value,
    (h) calculating a first distance between the first external transmitter and the transceiver arrangement based on a travel time of the received second message, and
    (i) calculating a second distance between the second external transmitter and the transceiver arrangement based on a travel time of the received third message.

13. A non-transitory computer usable medium having a computer readable program code embodied therein, the computer readable program code adapted to be executed on a processor to implement a method of determining a distance as claimed in claim 12.

\* \* \* \* \*